US006574441B2

(12) United States Patent
McElroy (10) Patent No.: US 6,574,441 B2
(45) Date of Patent: Jun. 3, 2003

(54) SYSTEM FOR ADDING SOUND TO PICTURES (76) Inventor: John W. McElroy, 51 Street Rd., Newtown Square, PA (US) 19073

( * ) Notice: Subject to any disclaimer, the term of this patent is extended or adjusted under 35 U.S.C. 154(b) by 0 days.

(21) Appl. No.: 09/872,015

(22) Filed: Jun. 4, 2001

(65) Prior Publication Data
US 2002/0181952 A1 Dec. 5, 2002

(51) Int. Cl.[7] ............................................... G03B 12/24
(52) U.S. Cl. ...................... 396/312; 396/315; 396/429; 396/544
(58) Field of Search ................................. 396/312, 315, 396/429, 544; 358/906; 348/231.4

(56) References Cited

U.S. PATENT DOCUMENTS

| 4,270,853 | A | | 6/1981 | Hatada et al. | |
|---|---|---|---|---|---|
| 4,270,854 | A | * | 6/1981 | Stemme et al. | 396/312 |
| 4,905,029 | A | | 2/1990 | Kelley | |
| 4,983,996 | A | | 1/1991 | Kinoshita | |
| 5,128,700 | A | | 7/1992 | Inoue et al. | |
| 5,260,795 | A | * | 11/1993 | Sakai et al. | 358/906 |
| 5,276,472 | A | | 1/1994 | Bell et al. | |
| 5,489,955 | A | | 2/1996 | Satoh et al. | |
| 5,721,992 | A | * | 2/1998 | Chovanes | 396/312 |
| 5,771,414 | A | | 6/1998 | Bowen | |
| 5,878,292 | A | | 3/1999 | Bell et al. | |
| RE36,589 | E | | 2/2000 | Akamine et al. | |
| 6,075,950 | A | | 6/2000 | Stephenson | |
| 6,128,037 | A | | 10/2000 | Anderson | |

* cited by examiner

Primary Examiner—Della J. Rutledge
(74) Attorney, Agent, or Firm—Blank Rome LLP (57) ABSTRACT A sound recording system is used in conjunction with a conventional camera (C) that by itself cannot record sounds. A sound recorder (100) has a mounting device (120, 190), a microphone (110), and a sound record switch (130) that is placed adjacent the shutter button when the recorder is mounted on the camera. A removable "Sound Stick" (200) is inserted into the sound recorder (100) through an opening (170). The "Sound Stick" contains memories (230) that record sound segments. A playback device, which may be separate or combined with the recorder is provided, into which the "Sound Stick" plugs into for downloading and playback of the sound segments. The "Sound Stick" includes a reading head (270) that can scan a bar code that correlates the sound segments with the pictures.

19 Claims, 6 Drawing Sheets

SYSTEM FOR ADDING SOUND TO PICTURES

FIELD OF THE INVENTION

The present invention relates to combined still photography and sound recording, where a sound playback of short interval, or sound segment, is associated with a respective photograph and can be heard while viewing the finished photograph. The sound recording can be made at the time of taking the photograph, or made at a later time and then associated with the photograph, so that a dual record of one time is made.

DESCRIPTION OF THE RELATED ART

Prior workers in this field have used various systems to combine a sound segment (short sound recording) with a still photograph, by recording sound, directly or indirectly, onto a photograph.

One approach incorporates a sound recording directly onto the photograph. An example of this approach is found in Kinoshita's U.S. Pat. No. 4,983,996. Kinoshita records the sound segment in the form of a bar code set in a photographic print along the border of the photographic picture. The bar code is made directly on the print, using the silver salts of the film, just as is the picture itself. Because the bar code can only contain a small amount of data, the sound quality and length are quite limited. Kinoshita's invention integrates the image recording and the audio recording mechanisms into the camera and the image and audio recordings into the film.

Also in the prior technology, movie films record sound directly onto the film, with a sound track recorded alongside the images as a strip of varying density. This is direct, unlike the bar-code recording of Kinoshita.

Another example is U.S. Pat. Re. No. 36,589 to Akamine. This patent discloses traditional silver-salt photographic prints with a magnetic strip embedded in the film. Rather than being used directly, the magnetically-recorded sound is converted into a two-dimensional pattern of light and dark that is placed on the back of the finished photograph. The user sweeps a scanner over the back of the photograph, where the audio data is printed, to hear the sound.

Figure 1:
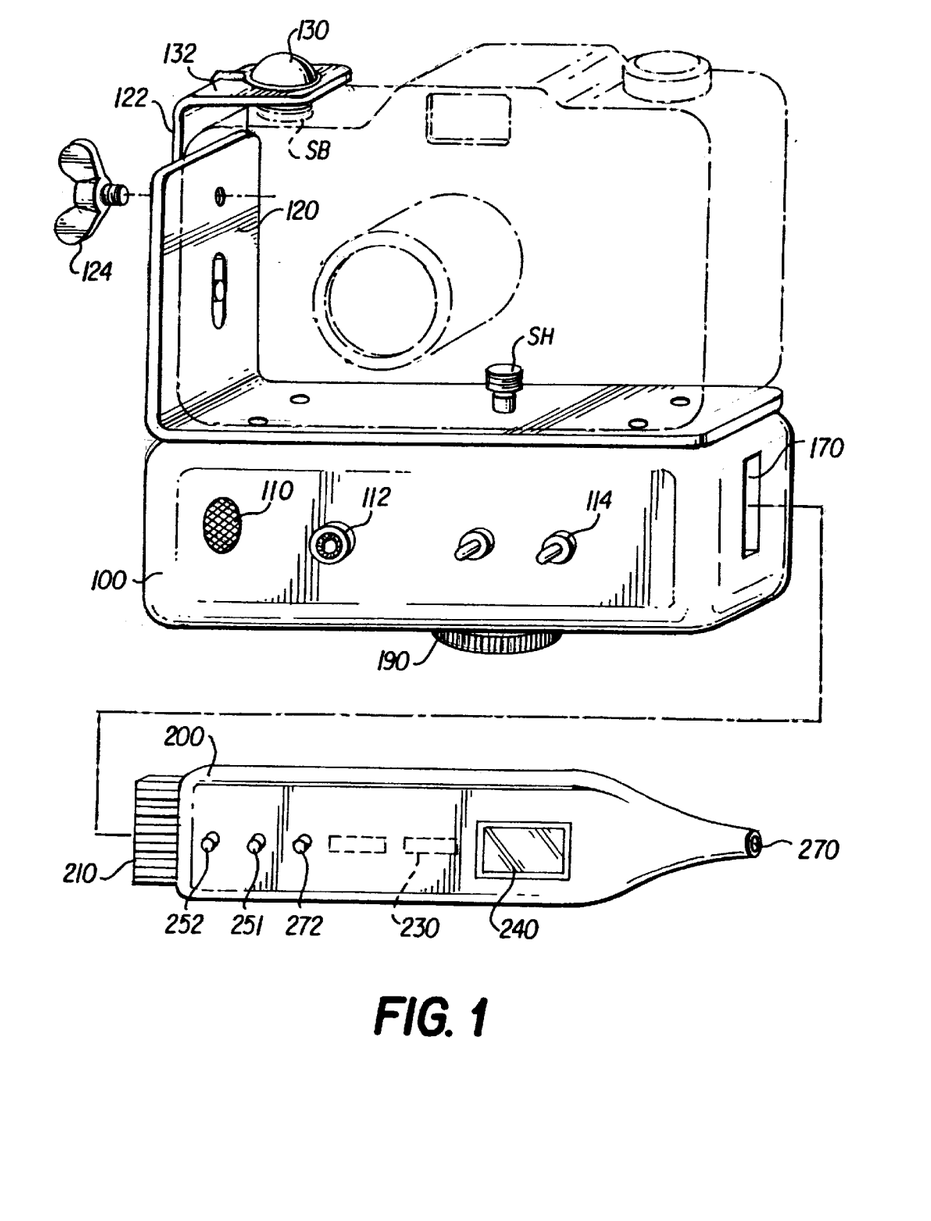
FIG. 1 is an exploded perspective view of the recording device and sound stick of the invention.
Figures 2, 3:
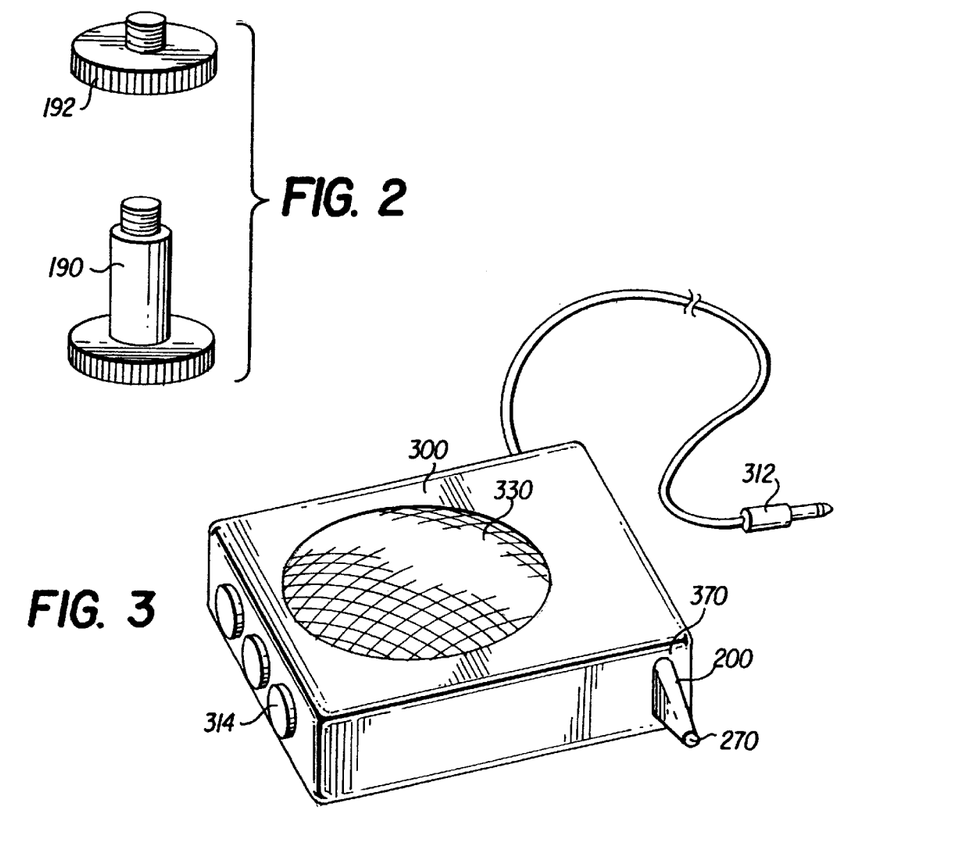
FIG. 2 is a perspective view of an attachment screw.
FIG. 3 is a perspective view of a playback device of the invention.

Kelley, in U.S. Pat. No. 4,908,029, shows a camera that has a built-in magnetic sound recorder including separate recording and playback transducers 30, 32 (FIG. 1). In one embodiment (FIGS. 2–3), the camera has a built-in tape recorder that transfers the sound data to a magnetic strip 102 held in a separate sound playback unit (FIG. 3). The magnetic strip 102 can be glued onto the photograph with which it is associated.

The second approach is to record the sound segments separately from the film and/or print, and to label the photograph. The information on the label is then used to select the proper sound segment from multitude of recorded sound segments.

Inoue et al, in U.S. Pat. No. 5,128,700, shows a system that uses a sound card 8 insertable into a sound card holder 9 that mounts on the camera. The camera includes a microphone and miniature speaker. A shutter release button 11 is disposed near a sound recording button 14. The sound from the sound card 8 is transferred to a diskette (FIG. 22) which is played back on a playback unit that also accepts the sound card (FIG. 21). The photographs have bar codes along the bottom edge that can electronically identify that particular photograph. When the photograph edge is inserted into the reader the playback unit plays the associated sound from the diskette. An alternative embodiment (drawing sheet 23) uses magnetic recording media mounted directly on the photograph.

Bell et al, in U.S. Pat. No. 5,878,292, shows a photograph with a memory chip embedded on the back side.

U.S. Pat. No. 6,075,950 to Stephenson discloses using the built-in film and frame markers of the APS (Advanced Photographic Standard), which come with the APS film, to associate the picture of one frame with the sound segment for that picture.

Anderson, in U.S. Pat. No. 6,128,037, discloses combining digital picture data and sound segment data.

All of these previous systems require special camera, film, and playback equipment to combine or associate the still image and the sound segment. They cannot be adapted to use with a camera of the conventional type that only takes pictures, and does not record sound.

SUMMARY OF THE INVENTION

The invention provides a system of recording and playing back sound segments, and associating those segments with particular photographs, that can be used with a conventional camera, either chemical or electronic. This allows adding sound without the expense of a completely new camera. Most people already own a conventional camera delivering high quality pictures. Also, this invention allows for sound recording and playback of sound segments and associating those segments with existing photographs.

To achieve this object, the present invention provides a sound recording unit that can be mounted on the body of a conventional camera to record sounds at the time the picture is taken, with a sound-record button that is also mountable on the camera, preferably adjacent to the shutter button of the camera. That position allows the user to depress the sound button just before, or at the same time as, the shutter button. The present invention is conveniently used with a conventional camera that has no sound recording capability.

Preferably, the sound-record button is adjacent the shutter button and in the preferred embodiment is directly above it. To adapt to different cameras, the sound-record button is preferably adjustable in position relative to the recorder, and may be independently mountable on the camera.

To maintain a record of what sound segment goes with what picture, a number of pull-off, press-on strips are provided on a card. The strips, each with a distinct bar code, are pulled off and put on the border of each finished print.

A playback device, preferably separate from the recorder, includes a loudspeaker and circuitry to play back the sound segment corresponding to the bar code of any picture, which the playback device can read.

The preferred embodiment of the invention employs a "sound stick" that fits into both the recorder and the playback device, with an electrical connector to mate with each, and that includes a digital memory.

Alternative embodiments produce short segments of magnetic tape that can be mounted on finished photographs.

With these and other objects, advantages and features of the invention that may become hereinafter apparent, the nature of the invention may be more clearly understood by reference to the following detailed description of the invention, the appended claims and to the several drawings attached herein.

DETAILED DESCRIPTION OF THE PREFERRED EMBODIMENTS

The preferred embodiment of the present invention is shown in FIG. 1. A sound recording unit or recorder 100 is fastened to a conventional camera C (shown in dashed outline), for example by a screw hole SH on the bottom of the camera body and a thumb screw 190 passing through the body of the recorder 100 and engaging the screw hole SH. The thumb screw 190 is preferably of the conventional type. The recorder 100 may also be fastened to the camera C by straps, hook-and-loop fasteners (e.g. VELCRO), or any other means, either removably or permanently, and it may mount in any position relative to the camera body, e.g. in back instead of underneath.

The recorder 100 includes a microphone 110 (preferably directional) to pick up sound segments to be recorded for later playback. The illustrated microphone is built in, but a remote microphone plugged into a receptacle 112 can also be used. Controls and/or indicators 114 may be provided. Power to the recorder is preferably provided by an insertable transfer device or "sound stick" 200, which is also the preferred sound storage device. Its operation will be described below.

The recorder 100 may include a bracket 120 fastened permanently or removably to the recorder, having a vertical leg which serves to locate a sound-record switch 130.

The preferred sound-record switch 130 is a "bubble" type push-button switch positioned directly over the shutter button SB of the camera. When pressed partially, the bubble switch closes, which is communicated to the electronics in the recorder 100 by wire cable 132 (preferably of the flat-cable type) and commences recording of the sound segment. When more fully depressed by increased finger pressure, the sound-record button 130 deflects so that the user's finger depresses the camera shutter button SB below the bubble switch. With the sound-record switch 130 located directly over the camera shutter button SB, the user can start the sound segment (selectable to run up to one minute, but preferably about five to ten seconds long) before the picture is "snapped", or press both simultaneously to record the sound after the picture is taken. The sound-record switch 130 may also be located adjacent to the camera shutter where a slight movement of the user's finger position can start the sound recording and shutter the picture. Alternatively, the sound recorder 100 may incorporate electronics that introduce a delay between activating the switch 130 and the start of recording.

The sound-record switch 130 is mounted on an switch-holding arm 122 that is adjustably fixed on the bracket 120, for example with a set screw 124. The adjustment allows the invention to be used with different cameras. Alternatively, the invention may omit adjustment. The arm 122 may be flexible enough that the switch 130 can be a non-deflecting type of switch, but the shutter button SB can be activated by depressing the end of the arm 122.

The position of the switch 130 may be adjustable vertically and also horizontally, to adjust for various cameras used with the invention.

The switch 130 may be located in another position, for example at the top of the vertical leg of the bracket 120 (this is not illustrated), where it would be generally alongside the shutter button SB. The user would then have the option of taking the picture before closing the sound-record switch 130. The sound-record switch 130 can be located in any position where it is usable.

Figure 5:
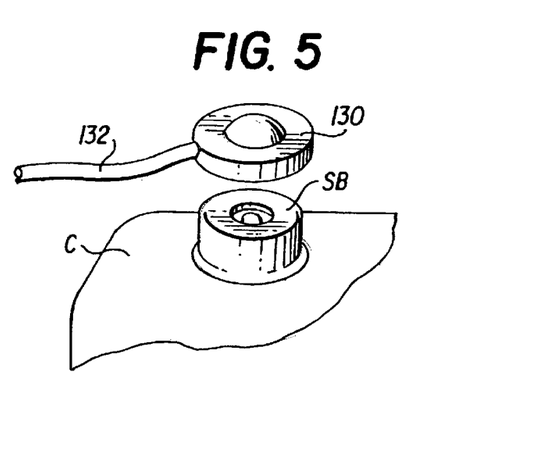
FIG. 5 is a detail view of an alternate embodiment of the invention.

FIG. 5 shows an alternative embodiment of the invention that omits the arm bracket 120 and mounts the sound-record switch 130 on the camera C by a separate attaching means. In FIG. 5 the shutter button SB is of the type that includes a central threaded opening for use with a remote shutter release. In the present invention the switch 130 threads into that opening and thereby is attached directly to the button SB. The cable runs down to the body of the recorder 100, and is preferably flexible. In alternative embodiments the sound-record switch 130 may be attached to the body of the camera C, preferably near the shutter button SB, by any other means, such as VELCRO, adhesive, clips, and so on. The invention also includes a permanently-or semi-permanently-attached device onto which the sound-record switch 130 is removably mounted. The cable 132 may alternatively plug into the receptacle 112, or a second receptacle like it (not shown), instead of being directly attached to the body of the recorder 100. The sound-record switch 130 may also be located directly on the body of the recorder 100.

The record unit 100 contains electronics, such as an amplifier, A/D converter, and so on, for processing sound segments picked up by the microphone 110.

The insertable transfer device or sound stick 200 is also shown in FIG. 1. This device, also called a "sound exposure stick" or "SES," is insertable into an opening 170 in the body of the recorder 100 as shown by the dashed line. When inserted, a connector 210 at the inserted end makes electrical contact with a mating connector inside (not shown). The connector 210 and its mate allow the transfer of sound data from the microphone 110 through the signal processing of the record unit 100 to the sound stick 200, which contains memories 230 that record the sound for later playback in the playback device 300 of FIG. 3. The sound stick memories 230 preferably contain about 100 Mb of digital memory where sound segments are stored in identifiable areas of memory for separate recall. The memory may be of any type, but preferably is solid state.

Figure 4:
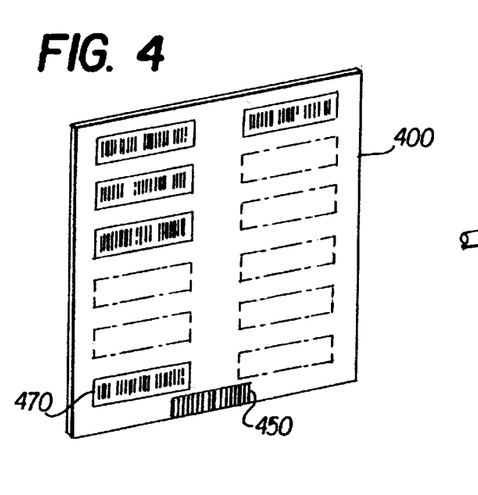
FIG. 4 is a perspective view of a sheet of stick-on bar codes.

The sound stick 200 includes a bar-code-reading head 270, which can be scanned over printed bar codes, and a read button 272 that actuates the reading head 270. FIG. 4 shows a sheet 400 with twelve removable, stick-on bar codes strips 470 (one for each exposure of a twelve-exposure roll of film). Each strip 470 has a distinct individual bar code, and the entire sheet 400 is also coded with a master or sheet code 450. The barcodes may be ultraviolet to minimize bar code impact on the picture.

To use the sound stick to record sounds associated with a photograph, the user first presses the read button 272 to instruct the sound stick 200 to input the next master bar code sheet as a directory, and then scans over the master bar code 450, which contains the number of records to be expected for storage (twelve in the case of a twelve-exposure roll of film and the twelve-bar-code sheet of exemplary FIG. 4).

An LCD (liquid crystal display) 240 is the preferred device for presenting a menu to the user. A second button 251 serves as a "scroll" button and a third button 252 serves as an "enter" button for negotiating the display on the LCD 240. The program that controls the screen display on the display device 240 is discussed below.

After the sound stick is programmed, it is then inserted and is ready to record all sound segments into memory each time that the sound-record switch 130 is actuated or closed. The sound segment data records are grouped under the index of the master code 450 until the next master code in inputted.

FIG. 3 shows the playback device 300 that, after the film is developed and the prints are obtained (or after digital picture data is retrieved and imaged on paper or a screen), recreates the sound segment recorded for each picture. The sound stick is put into an opening 370 of the playback device 300, where another internal connector (not shown) makes electrical contact with the connector 210 of the sound stick 200. Sound data stored in the sound stick 200 is retrieved from memory, turned into a sound signal by D/A converter, amplifiers, and the like contained in the playback device 300, and emitted as sound from a loudspeaker 330. Headphones (not shown) can also be used.

The bar codes of FIG. 4 preferably are by this time mounted on the prints respectively corresponding to them, for example with adhesive. To view the pictures from one roll of film, the user scans the reading head 270, which is part of the sound stick 200, while attached to the playback device 300 as shown in FIG. 3, over any of the picture bar codes 470 on any picture. The sound segment is heard immediately upon scanning and is available to hear again. The playback device 300 preferably includes controls 314 such as volume control, play and repeat sound segment replay controls, and/or a read button for bar code scanning. These controls 314 may be omitted in lieu of providing control through the scroll button 251 and enter button 252.

Figure 10:
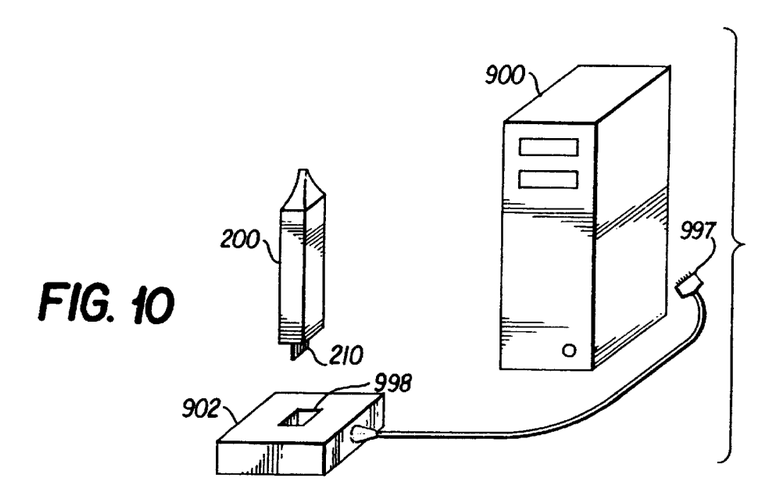
FIG. 10 is a perspective view of the cradle device for connection to a computer.

FIG. 10 shows a cradle connector 902 for connecting the sound stick 200 to a PC 900. Sound stick 200 (transfer device) connector 210 plugs into a receptacle 998 on the cradle while connector 997 is preferably a serial port connector to the PC. Software routines allow for the recorded sound exposures to be backed up within the PC. This same cradle connector 902 and associated software allows for transmitting sound exposures across e-mail or the internet as required for various applications (e.g., magazines and periodicals).

FIG. 3 also shows a jack 312 leading from the playback device 300. This jack can mate with the receptacle 112 of FIG. 1, and transfer data, for example, sound data from the sound stick 200 when it is inserted into the recorder 100. It could also supply low-voltage power from a transformer.

Figure 8:
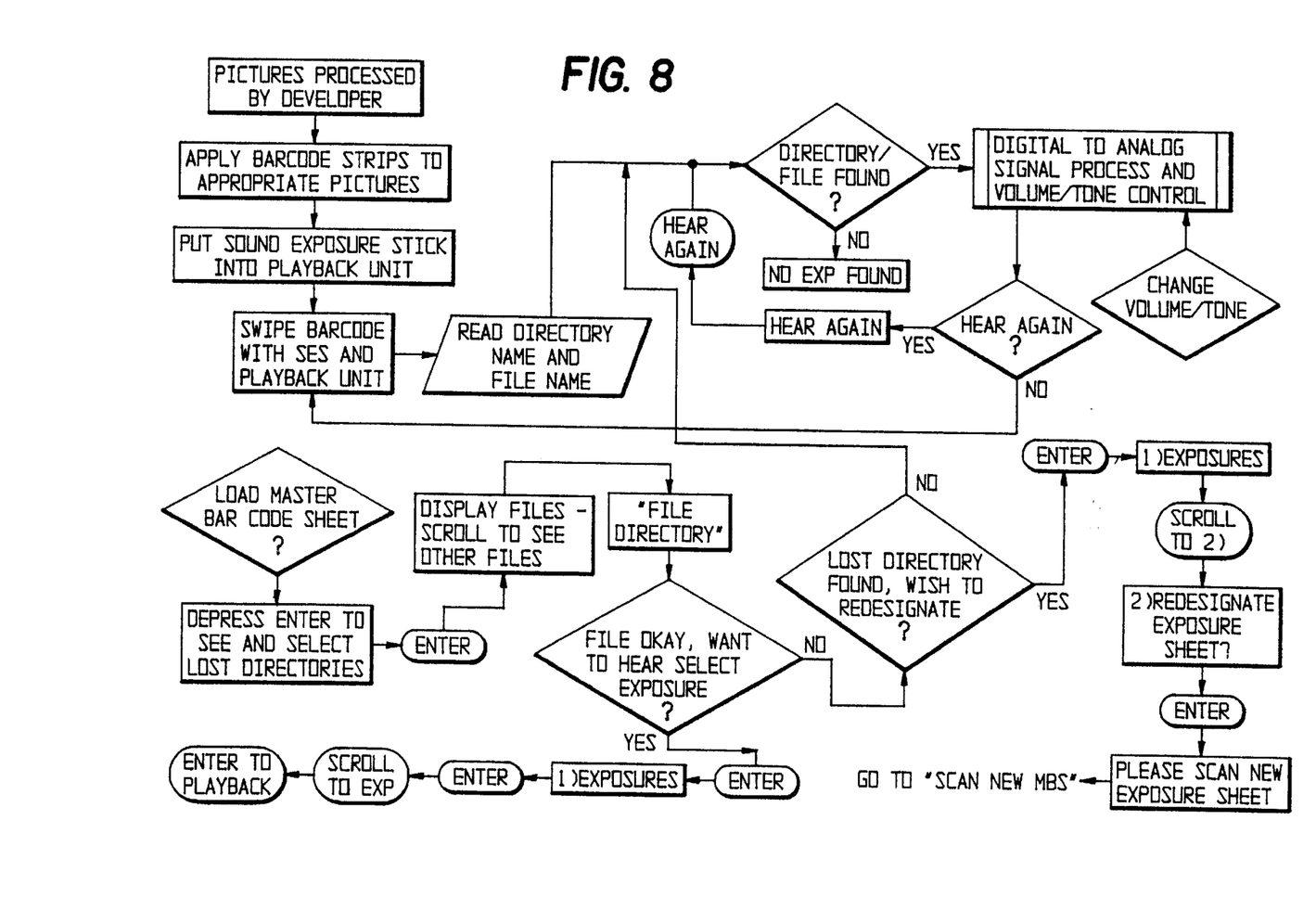
FIG. 8 is a schematic view of operating software of the invention.
Figure 9:
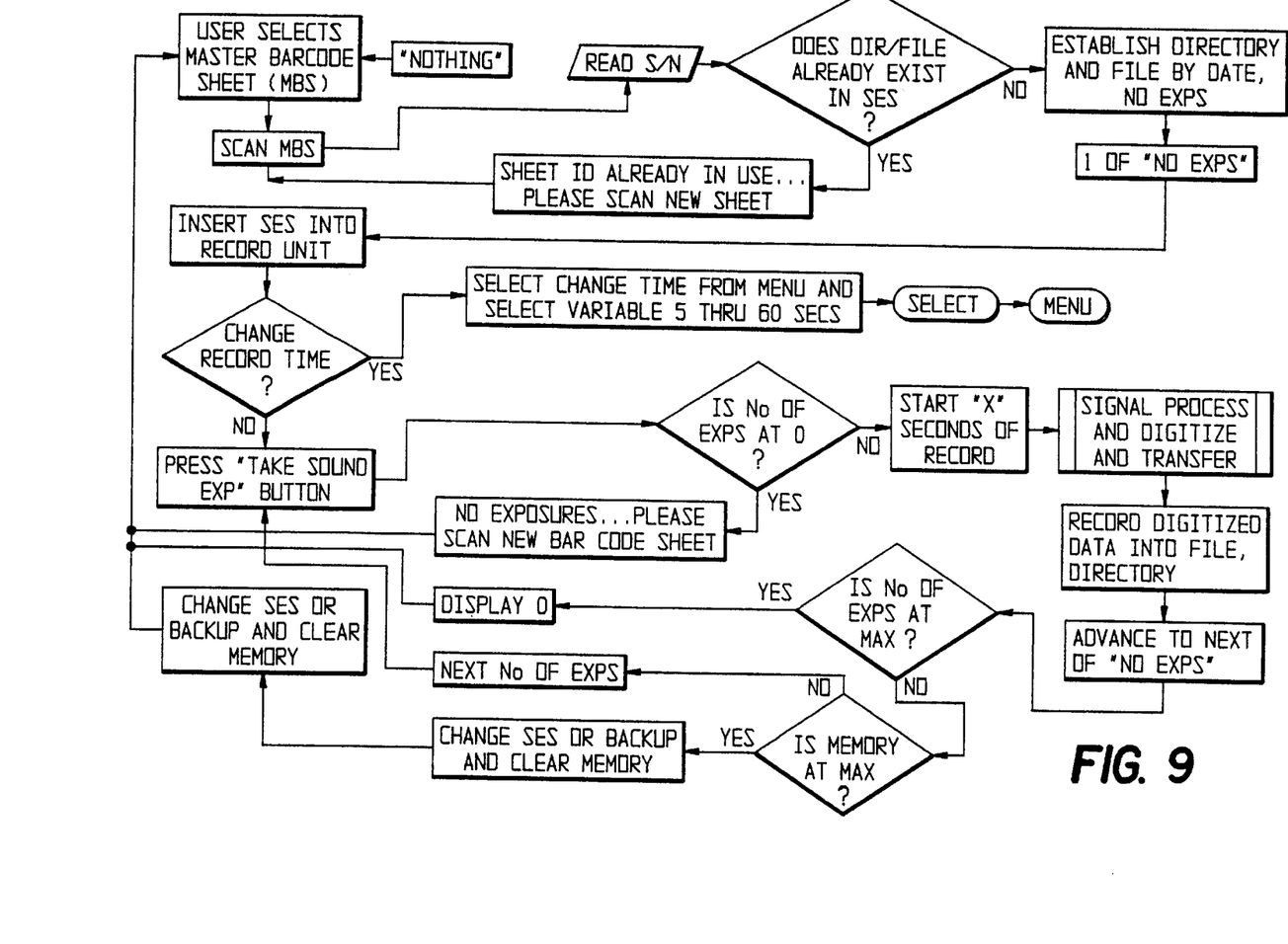
FIG. 9 is a schematic view of playback and restore software of the invention.

A preferred embodiment of software for the invention is shown in FIGS. 8 and 9. The software logic of FIGS. 8 and 9 conforms to the description of operation contained herein. Additionally the software logic describes the function of recognizing the end of the allotted number of sound exposures within a directory; a method for re-establishing a master bar code sheet in the event it had been lost before the bar code strips could be put on the specified pictures; and a method for detecting when the sound stick memory 200 is full.

In an alternative embodiment the recorder 100 and the playback device 300 can be combined in one unit. For example, the recorder 100 of FIG. 1 could be modified to include a loudspeaker (not shown in FIG. 1), the switch cable 132 could be removable via a jack and receptacle like jack 312 and receptacle 112, and the body of the recorder 100 could be made removable from the bracket 120. In such an embodiment, the separable sound stick 200 would not be needed, and the parts of the sound stick and playback device 300 could be incorporated into the recorder 100. In that case, the recorder 100 advantageously might be removable to permit the reading head 270 to be scanned over a bar code on the sheet 400 or on a photograph or computer-printout picture.

FIG. 2 shows screws of a type which would allow the bracket 120 to remain on the camera C while the rest of the recorder 100 were removed: the screw 192 has a base that includes a threaded hole accepting the threaded portion of the shoulder screw 190. The upper part of the body of the recorder 100 could have a circular depression to accommodate the knurled head of the screw 192.

The present invention contemplates another embodiment wherein individual memory units or devices correspond to individual pictures. For example, the sound stick memories 230 may have individual memory units, such as memory chips, that are dedicated to one picture, a pair of pictures, and so on.

Figure 6:
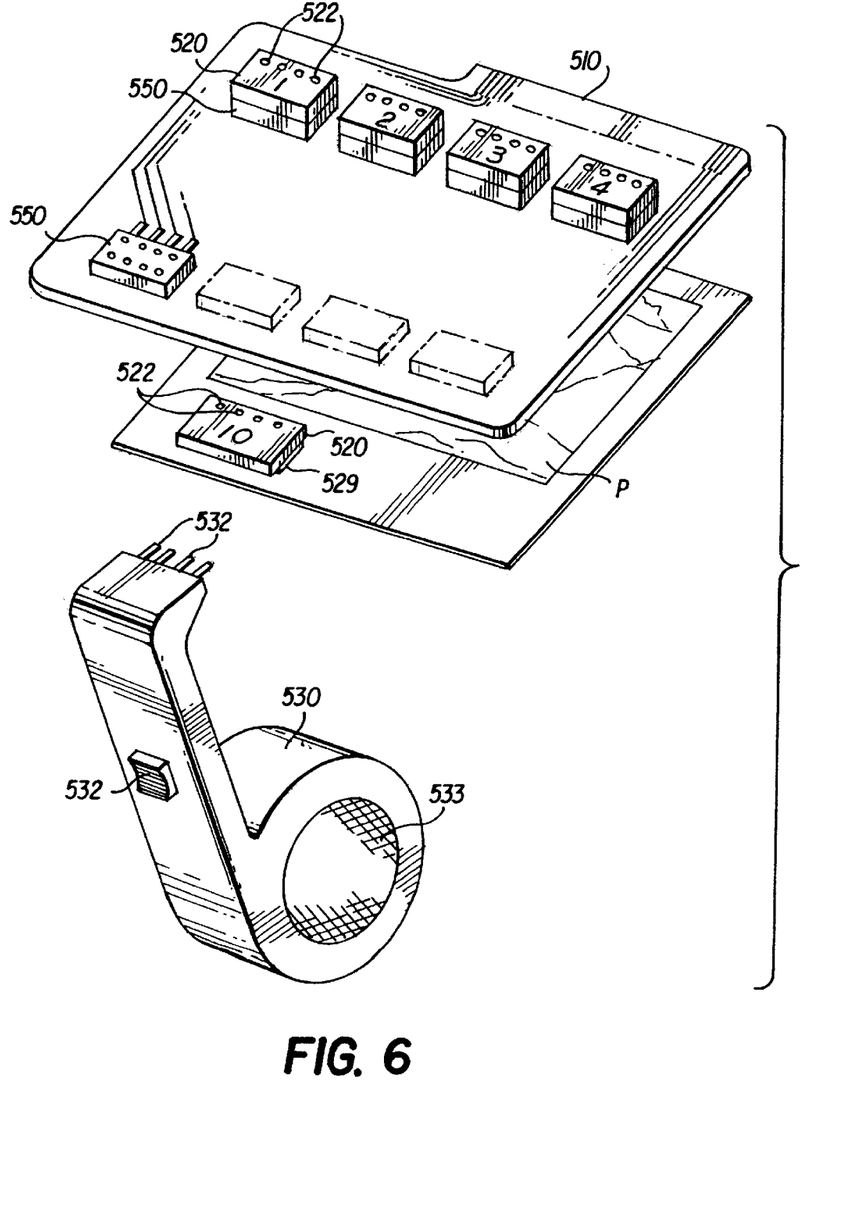
FIG. 6 is a perspective view of second embodiment of the invention.

FIG. 6 shows individual memory units 520 mounted on a printed circuit board (or other substrate) 500. The units 520, which might comprise individual digital memory chips inside a suitable package, are preferably inserted into sockets 550 permanently mounted on the board 500. The sockets are connected by solder lines to a connector portion 510 which preferably mates with the recorder 100 and make contact, through the bottom of each memory unit 520, with the electronic storage medium inside. In this embodiment the recorder 100 includes a port to mate with the connector 510 (not shown) and suitable electronics to record sounds picked up by the microphone 110 on a memory unit corresponding to the picture taken. The units 520 are preferably labeled with number indicia corresponding to one exposure (picture) in a roll of film.

After all of the pictures are obtained in the form of photographic prints P, the units 520 are removed from the board 500 and mounted on corresponding picture prints P. An adhesive 529 may be used for mounting.

Each of the memory units 520 includes a suitable number of unit contacts 522 which mate with pickup contacts 532 on a hand-held digital playback unit 530. The pickup contacts 532 retrieve sound data from the memory unit 520 mounted on the card and play the sound through a loudspeaker 533. Touching the unit contacts 522 to the pickup contacts 532 and pressing a switch 532 causes sound data to be loaded into electronic circuits of the digital playback unit 530, converted from digital to analogue signals (if the memory units 520 store digital sound data), and sent to the loudspeaker 533. Pressing the switch 532 again causes the sound segment to be played back again. The invention also contemplates including several distinct sound segments in each memory unit 520, which may be accessed or played back sequentially.

Figure 7:
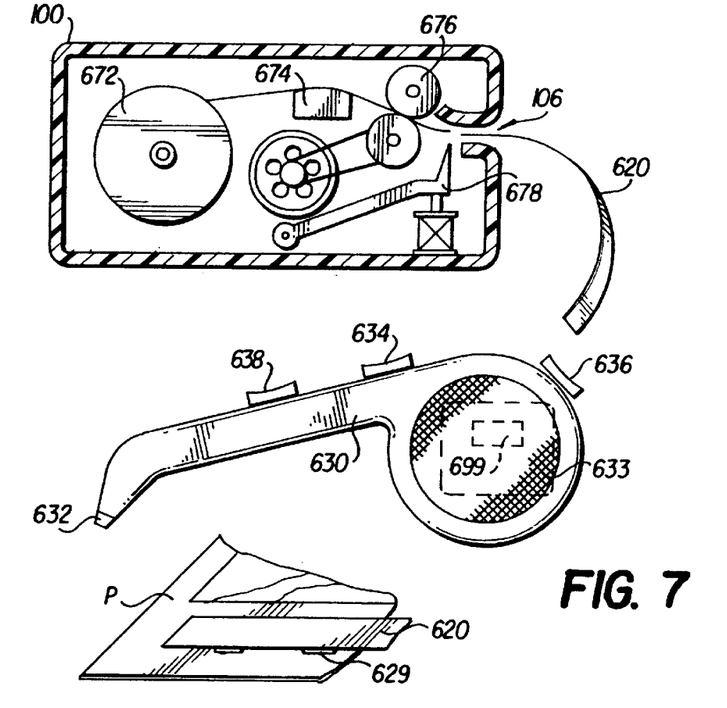
FIG. 7 is a perspective view of third embodiment of the invention.

FIG. 7 shows a third embodiment of the invention that uses strips of magnetic tape 620 as memory units. Each strip 620 is mounted on its respective picture print P, as shown, preferably with adhesive 629 (that may be incorporated on the tape 620 or on the print P). Sound segments preferably are recorded onto the strips 620 inside the housing of the recorder 100 and played back by a magnetic playback unit 630 having a magnetic pickup head 632 that is scanned over the magnetic strip 620 mounted on the print P.

The recorder 100 of the third embodiment is shown in cross section in FIG. 7. A preferred embodiment of the recording mechanism provides a roll or cassette 672 of blank magnetic tape that is passed, during recording, over a recording head 674 by a mechanism 676. The sound segment is thus recorded onto a corresponding tape segment. After the sound segment is recorded, the tape segment is cut off by a cutter 678 and falls out of a slot 106 in the side of the recorder 100 housing. That tape segment is mounted on the print P to be scanned by the magnetic pickup head 632 of the playback unit 630.

The magnetic playback unit 630 includes a built-in loudspeaker 633, a volume switch 636, a reset/ready switch 634, and a play/replay switch 638. An internal circuit 699 accepts signals from the pickup head 632 as it is held against the tape segment 620 and scanned along its length and stores them temporarily in digital format, preferably using an A/D converter. After the input stops, the circuit 699 reconstitutes the sound segment data according to the actual time of recording at the recording head 674 (to avoid overall speedup or slowdown) while also adjusting the timing to avoid wow or flutter due to inconstant sweep of the pickup head 632 across the tape segment 620.

To hold the tape segments 620 until the prints P are obtained, the invention preferably includes a print media card (not shown) that includes numbered areas of adhesive of the type that will hold a tape segment but will not stick to the tape segment when it is peeled off. As each segment of tape 620 emerges from the slot 106, it is pressed onto the next numbered area. When the prints P are obtained, the tape segments are transferred to them.

Although certain presently preferred embodiments of the present invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

What is claimed is:

1. A system for recording and playing back through playback loudspeakers a plurality of sound segments each associated with a respective one of a plurality of pictures taken by a camera comprising:
   a sound recording unit comprising a microphone, a mounting device for mounting the sound recording unit on a camera, and a sound-record switch positionable adjacent the camera when the recorder is mounted on the camera;
   a sound recording medium for recording the sound segments associated with the pictures taken by the camera when the sound recording medium is coupled to the microphone, and playing back the sound segment when the sound recording medium is coupled to a playback device to play back the sound segments recorded on the sound recording medium, the playback device including playback loudspeakers.

2. The system according to claim 1, comprising a plurality of picture labels.

3. The system according to claim 2, wherein the picture labels comprise bar codes and the system further comprises a bar code reader.

4. The system according to claim 1, comprising a plurality of sound segment storage units.

5. A system for recording and playing back through playback loudspeakers a plurality of sound segments each associated with a respective one of a plurality of pictures taken by a camera comprising:
   a sound recording unit comprising a microphone, a mounting device for mounting the sound recording unit on a camera, and a sound-record switch positionable adjacent the camera when the recorder is mounted on the camera;
   a sound recording medium for recording the sound segments associated with the pictures taken by the camera when the sound recording medium is coupled to the microphone, and playing back the sound segment when the sound recording medium is coupled to a playback device to play back the sound segments recorded on the sound recording medium, the playback device including playback loudspeakers; and
   wherein positioning of the sound-record switch adjacent the camera is adjustable.

6. A system for recording and playing back through playback loudspeakers a plurality of sound segments each associated with a respective one of a plurality of pictures taken by a camera comprising:
   a sound recording unit comprising a microphone, a mounting device for mounting the sound recording unit on a camera, and a sound-record switch positionable adjacent the camera when the recorder is mounted on the camera;
   a sound recording medium for recording the sound segments associated with the pictures taken by the camera when the sound recording medium is coupled to the microphone, and playing back the sound segment when the sound recording medium is coupled to a playback device to play back the sound segments recorded on the sound recording medium, the playback device including playback loudspeakers; and
   wherein the sound-record switch is positioned adjacent a shutter button of the camera.

7. A system for recording and playing back through playback loudspeakers a plurality of sound segments each associated with a respective one of a plurality of pictures taken by a camera comprising:
   a sound recording unit comprising a microphone, a mounting device for mounting the sound recording unit on a camera, and a sound-record switch positionable adjacent the camera when the recorder is mounted on the camera;
   a sound recording medium for recording the sound segments associated with the pictures taken by the camera when the sound recording medium is coupled to the microphone, and playing back the sound segment when the sound recording medium is coupled to a playback device to play back the sond segments recorded on the sound recording medium, the playback device including playback loudspeakers; and
   wherein the sound-record switch is placed such that the sound record button and a shutter button of the camera is operable with a single motion.

8. A system for recording and playing back through playback loudspeakers a pluraltiy of sound segments each associated with a respective one of a plurality taken by a camera comprising:
   a sound recording unit comprising a microphone, a mounting device for mounting the sound recording unit on a camera, and a sound-record switch positionable adjacent the camera when the recorder is mounted on the camera;

a sound recording medium for recording the sound segments associated with the pictures taken by the camera when the sound recording medium is coupled to the microphone, and playing back the sound segment when the sound recording medium is coupled to a playback device to play back the sound segments recorded on the sound recording medium, the playback device including playback loudspeakers; and wherein the sound recording unit and the playback device comprise seperate units, the playback device is not mountable on the camera, and the sound recording medium is comprised of a transfer device adapted to be coupled to the sound recording unit and the playback device.

9. The system according to claim 8, wherein the transfer device is adapted to be coupled to the sound recording unit and the playback device by mating electrical connectors comprised in the transfer device and at least one of the sound recording unit and the playback device.

10. The system according to claim 9, wherein the transfer device is elongated, wherein at least one of the sound recording unit and the playback device comprises an opening into which the transfer device is insertable, and wherein the electrical connector of the transfer device is disposed at an inserted end of the transfer device.

11. The system according to claim 10, comprising a bar code reader and a plurality of picture labels each comprising a respective bar code, and wherein the bar code reader is located at an end of the transfer device opposite to the inserted end of the transfer device.

12. The system according to claim 8, comprising a bar code reader and a plurality of picture labels each comprising a respective bar code, and wherein the transfer device comprises the bar code reader.

13. A system for recording a plurality of sound segments to be played back on a playback device, each of the sound segments being associated with a respective one of a plurality of pictures taken by a camera comprising:

a sound recording unit comprising a microphone, a mounting device for mounting the sound recording unit on the camera, and a sound-record switch positionable adjacent the camera when the recorder is mounted on the camera;

a transfer device adapted to be coupled to the sound recording unit comprising a sound recording medium for recording the sound segments associated with the pictures taken by the camera when the sound recording medium is coupled to the microphone; and whereby a sound segment is playable on the playback device.

14. A system for recording and playing back a plurality of sound segments recorded in a sound recording unit wherein each of the sound segments is associated with a respective one of a plurality of pictures taken by a camera comprising:

a sound recording unit comprising a microphone, and a mounting device for mounting the sound recording unit on a camera;

a playback device to play back the sound segments recorded on a sound recording medium; and a transfer device adapted to be coupled to the playback device comprising the sound recording medium for recording the sound segment recorded on the sound recording medium and associated with the one of the pictures taken by the camera.

15. A system for recording and playing back a plurality of sound segments each associated with a respective one of a plurality of pictures taken by a camera comprising:

a sound recording unit comprising a microphone, and a mounting device for mounting the sound recording unit on a camera;

a sound recording medium for recording the sound segments associated with the pictures taken by the camera;

a playback device to play back the sound segments recorded on the sound recording medium; and an electrical connector matable with the sound recording unit and the playback device for transfer therebetween of picture information.

16. The transfer device according to claim 15, wherein the transfer device is elongated, wherein at least one of the sound recording unit and the playback device comprises an opening into which the transfer device is insertable, and wherein the electrical connector of the transfer device is disposed at an inserted end of the transfer device.

17. The transfer device according to claim 15, comprising a bar code reader located at an end of the transfer device opposite to the inserted end of the transfer device.

18. The transfer device according to claim 15, comprising a plurality of sound segment storage units.

19. The transfer device according to claim 15, comprising means for connecting to a PC for backup, transmitting, and recording of sound segments by e-mail or internet associated with pictures, wherein those sound segments received by e-mail or internet are so coded to refer to pictures with proper coding that were received separately by some means.

* * * * *